Figure 4:
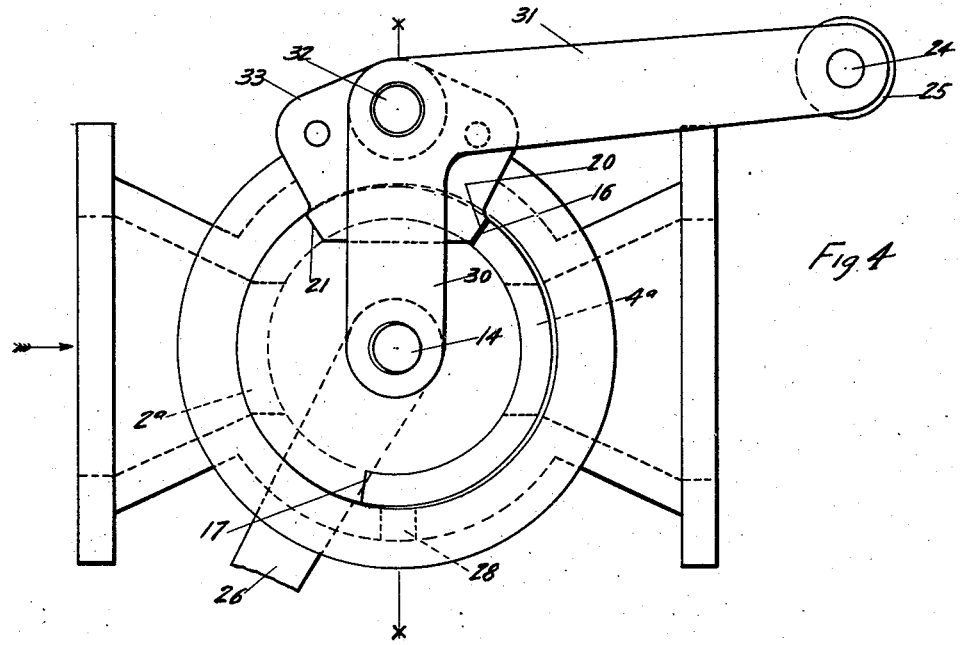

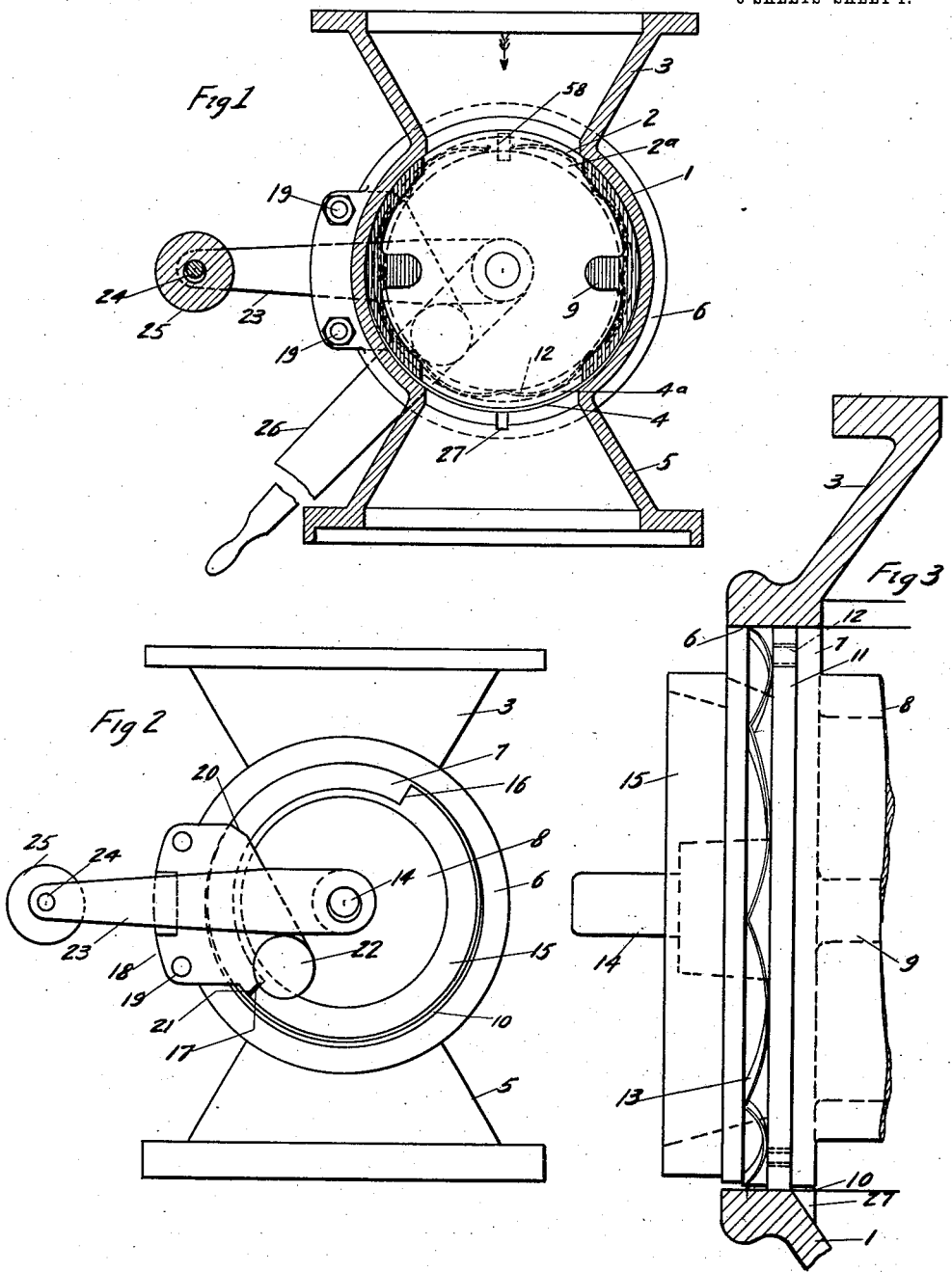

M. W. JOHNSON, Jr.
FURNACE GAS VALVE.
APPLICATION FILED JULY 31, 1911.

1,024,785.

Patented Apr. 30, 1912.

3 SHEETS—SHEET 2.

WITNESSES:

INVENTOR
Mark W. Johnson, Jr.
BY
ATTORNEY

M. W. JOHNSON, Jr.
FURNACE GAS VALVE.
APPLICATION FILED JULY 31, 1911.
1,024,785.
Patented Apr. 30, 1912.
3 SHEETS—SHEET 3.
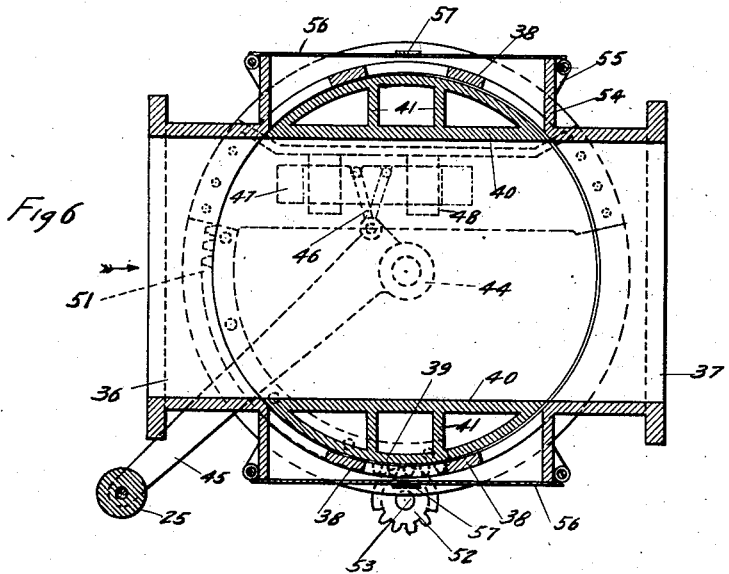
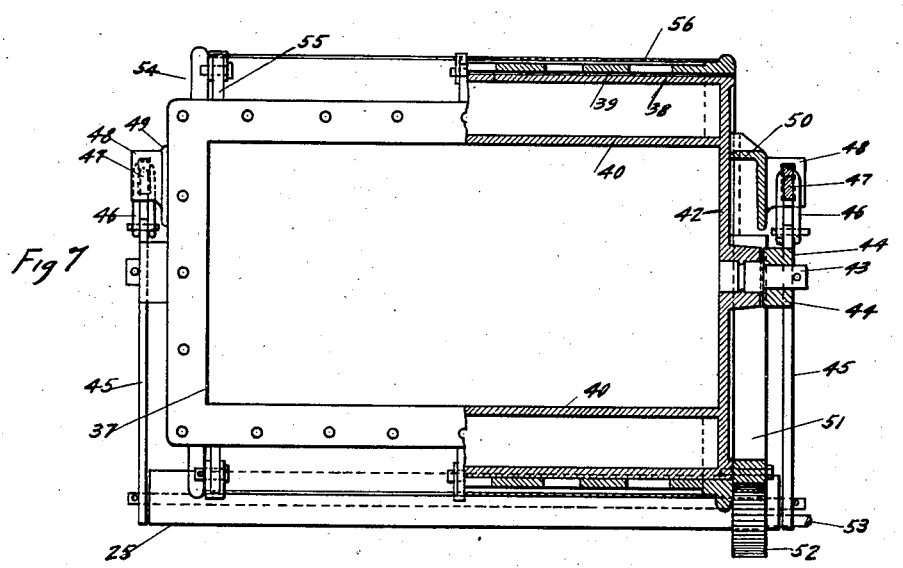
WITNESSES:
INVENTOR
Mark W. Johnson, Jr.
BY
ATTORNEY

UNITED STATES PATENT OFFICE.

MARK W. JOHNSON, JR., OF ENSLEY, ALABAMA, ASSIGNOR OF ONE-HALF TO KARL LANDGREBE, OF ENSLEY, ALABAMA.

FURNACE GAS-VALVE.

1,024,785.      Specification of Letters Patent.      Patented Apr. 30, 1912.

Application filed July 31, 1911. Serial No. 641,458.

*To all whom it may concern:*

Be it known that I, MARK W. JOHNSON, Jr., a citizen of the United States of America, residing at Ensley, in the county of Jefferson and State of Alabama, have invented certain new and useful Improvements in Furnace Gas-Valves, of which the following is a specification.

My invention relates to an improved type of valve peculiarly adapted for use in connection with gas, air or water carrying a large percentage of impurities or sediment which tend to clog the valve and accumulate on its seat so as to make it hard to operate and interferes with its giving an effective seal.

It is primarily designed for use with furnace gas which carries a large quantity of flue dust and which has heretofore necessitated the use of very cumbersome and ineffective valve structures.

To facilitate the ease of operation and prevent the clogging of the valves, I use a rotary or semi-rotary valve which fits loosely in the valve chamber and is supported and held by counterweight or equivalent means against the gas inlet port for its chamber so as to effectively seal it while standing clear of the chamber elsewhere. The utilization of the counterbalance or any equivalent means to hold the freely rotatable valve against only that portion of its seat where it closes the inlet gas port, leaves the valve with the minimum of seat friction and adapts it for ready and easy operation.

As a further feature of my invention, I claim broadly the use in connection with a valve of the foregoing type of means to adapt the valve to function with equal efficiency when the direction of flow of the gas is reversed through the valve casing.

A further feature of my invention which I desire to claim broadly is the providing of an open ended valve chamber into which the valve can be quickly inserted and from which it can be easily withdrawn, the valve having sufficient packing to prevent leakage about it at its ends.

Another feature of advantage of my improved valve is that it is not likely to warp or be affected by the heat of the gases when utilized to control the supply of gas to furnace stoves or boilers, or to large gas mains, in which connections I have illustrated my invention as a preferred use therefor. It is understood, however, that the novel construction of my valve is not limited particularly to gases but is available for any character of fluids.

One advantage of my valve is that it can be very cheaply constructed, as the machine work on the castings is mostly boring.

My invention further comprises the details of construction and arrangement of parts which are more fully described hereinafter and claimed, reference being had to the accompanying drawings, in which:—

Figure 5:
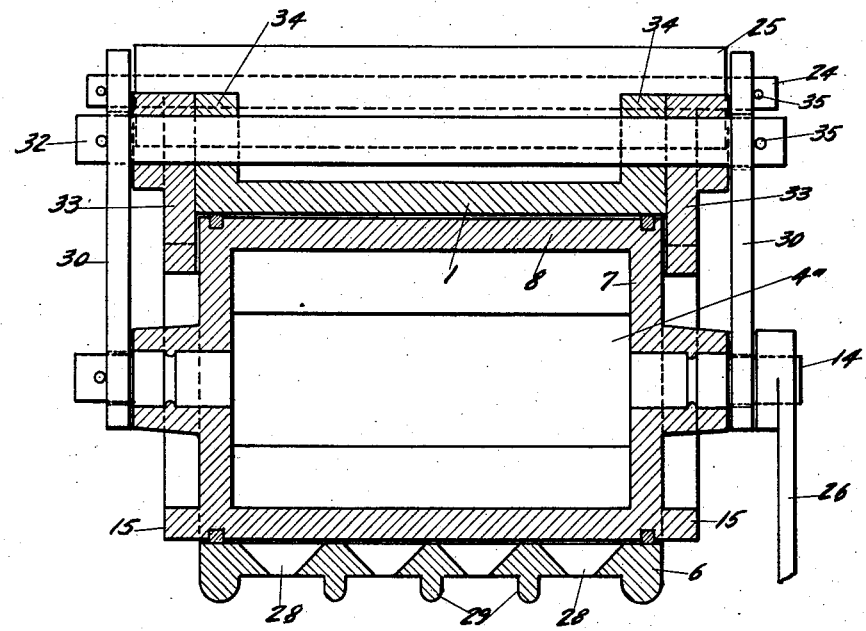

Figure 1 is a vertical cross sectional view through a furnace valve adapted for use in vertical gas mains. Fig. 2 is an end elevation of Fig. 1. Fig. 3 is an enlarged cross sectional view through an end bearing of the valve and casing showing the manner of packing the valve end. Fig. 4 is a modification of my valve in end elevation as adapted for use in horizontal gas mains. Fig. 5 is a vertical cross sectional view along the line *x—x* of Fig. 4. Fig. 6 illustrates in vertical cross section a further modification of my improved valve for use in the big horizontal gas main and adapted to be set to valve off the flow of gas from either direction with equal efficiency. Fig. 7 is a partial end elevation in vertical cross section through Fig. 6.

Similar reference numerals refer to similar parts throughout the drawings.

Referring to the valve construction illustrated in Figs 1 to 3, the valve casing 1 is provided with a cylindrical valve seat open at its ends and of substantially uniform diameter. The seat has an inlet port 2 which extends through a flanged extension 3 of the casing and is adapted to connect to the gas supply pipe (not shown). In like manner the seat is provided with an outlet port 4 opposite port 2 and connecting with an extension 5 to which the outlet gas pipe (not shown) is connected. At each end the casing 1 has cylindrical end bearing seats 6 which receive the circular ends 7 of the rotary valve 8, which valve is formed as a hollow cylindrical shell provided with oppositely disposed longitudinal reinforcing ribs 9 spaced midway between oppositely disposed ports 2ª and 4ª which extend longitudinally between the ends 7 of the valve. These ends 7 are preferably formed integral with the shell 8 and form a closure for the end openings of the valve casing, the valve ends 7 being sufficiently less in diameter than the casing to leave a small clearance 10 at the bottom when the valve is held against the upper inlet port 2 in the manner hereinafter described.

The end 7 is circumferentially slotted and has disposed therein a split packing ring 11 which is spread and held expanded against the seat 6 by a spring 12, which extends around the groove in which the ring is seated. In like manner the ring is held against the inner side wall of the groove by means of an annular corrugated spring 13 which bears against the ring and the outer side wall of the groove. Each valve end 7, at its outer face, is provided with a central integral bearing stud or trunnion 14 and with an annular outside shoulder 15 which is provided with stop faces 16 and 17. I secure to each end 6 of the valve casing a plate 18 by nuts and bolts 19 and I provide this plate with two abutment faces 20 and 21 so disposed as to be engaged by the faces 16 and 17, respectively. At the inner end of the plate I form a laterally projecting fulcrum pin 22 which receives and supports a horizontally disposed arm 23 provided with an opening at its inner end to receive the valve trunnion 14 with a loose fit. The outer ends of the arms 23 are cross connected by a rod 24 which receives a counterbalance weight 25. One of the trunnions 14 has connected to it an arm 26 by means of which the valve can be operated. I provide a slot 27 in the bottom of the seat 6 under the inner edge of the valve end 7 so that the dirt and dust tending to accumulate under the valve will, as the valve is operated, work out through this slot and pass out through the outlet pipe.

In practice the counterbalance weight 25 is designed to support the weight of the valve and force it with the requisite pressure against the upper portion of the valve seat to furnish an effective closure for the inlet port 2 when the valve ports 2ª and 4ª are not in register with the ports 2 and 4 in the valve seat. This is the position assumed by the valve when its stops 17 are thrown against the abutments 21, as seen in Fig. 2. As will be noted from Fig. 2 the counterbalance weight holds the weight of the valve off its seat, leaving the clearance 10 which makes it impossible for the valve to stick or become clogged and the slot 27 in connection with the rotary movements of the valve prevents the accumulation of sediment on the seat, leaving the valve free to turn on its trunnions with practically negligible friction in any of its movements. When this feature is considered in connection with the heavy and cumbersome valves used for handling furnace gas, it will be seen that my construction presents the simplest form of valve which may be readily inserted and withdrawn from the valve casing and which operates with a minimum friction and without expansion and contraction troubles to produce an effective seal. At the same time the valve can be very cheaply constructed as it requires principally boring work.

In Fig. 4 I illustrate a slight modification of the valve as designed for horizontal use. In this case the valve is similar to the valve shown in Fig. 1 and is provided with a cylindrical body portion 8, ends 7, and the ports 2ª and 4ª. The valve casing is also similar to the casing 1 except that the under side thereof, below the valve center, is provided with a series of transverse ports 28 which are separated by reinforcing ribs 29 to strengthen the shell. These openings function after the fashion of the slots 27 in Fig. 1, and act to carry off the dust and cinders which tend to collect under the valve. In this construction the valve trunnions 14 are supported in the lower ends 30 of a pair of bell crank levers 31 which are pivotally supported on a cross shaft 32 which passes through the stop plates 33 and through the flanged portions 34 cast integral with the end flanges of the valve casing 1. The outer ends of arms 31 of the levers receive the rod 24 upon which the counterbalance weight 25 is mounted. Both the rod and shaft 32 receive cotter pins 35 to hold them in assembled relationship with the other parts. The stop plate 33 is provided with the abutment faces 20 and 21, and the valve in like manner has the stop faces 16 and 17. The operation of the valve in this construction is substantially identical with that already given in connection with Fig. 1, it being noted that the counterbalance weight through the bell crank levers both supports the rotary valve and urges it in the direction of the inflowing gases, leaving clearance at the exhaust port and under the valve sufficient to prevent the valve binding in its seat or becoming difficult to operate. In this connection it will be obvious that the valve may be reversed as to operation so as to handle gases flowing in the reverse direction to the arrows by simply reversing the bell crank levers 31 on their shaft support.

In Figs. 6 and 7 I show a further adaptation of my invention for use in the large gas main leading to the stoves where the valve may be called upon to cut off the flow of gas in either direction and which will have the additional advantage of effectively preventing the leakage of gas past the valve which is often fatal to men working in the portion of the gas main requiring repair and from which the valve is relied upon to cut off the gas. According to this construction the heavy gas main connects to the flanged inlet and outlet ports 36 and 37, respectively, which open into a circular valve seat provided with grated top and bottom portions formed by spaced transverse bars 38 formed integrally with the casing. A cylindrical valve 39 is inserted endwise into the valve seat and is braced by reinforcing ribs 40 and 41 opposite the arcuate portions of the valve. These arcuate valve portions 39 connect the ends 42 of the valve, which ends receive valve trunnions 43 which are each journaled in a bearing 44 formed as an angled extension of a lever 45 which is hung by a link 46, pivotally connected thereto, from a slide 47, which slide is mounted in guides 48 formed integral with or attached to a cross plate 49 riveted or bolted to the valve casing and disposed across the open ends of the cylindrical valve seat. This cross plate 49 on one side is provided with a bracket support 50 which overhangs the trunnion 43 sufficiently to permit a segmental rack 51 to be bolted to the lower portion of the valve and disposed between the valve end 42 and the adjacent lever 45. This rack meshes with a pinion 52 mounted on a shaft 53 and operated in any suitable manner to control the valve. The main casing is provided top and bottom, opposite the grated portions thereof, with a flanged extension 54 which extensions are provided with lugs 55 along opposite sides to which swinging doors 56 are pivotally connected. The doors are used in pairs and are adapted to be held normally in closed position by bars 57 which are suitably connected to the extensions 54. In the position shown in Fig. 6, the valve supporting levers 45, which at their lower ends carry the counterbalance weight 25, are so suspended by their links 46 from a notch in the bars 47 that the center of gravity of the suspended mass will urge the valve to the left, the counterbalance weight being sufficient to force the valve to press against the port 36 and effectively seal same when the valve is rotated into its closed position. Should it be desired to reverse the flow of gas so that it enters the valve casing through the port 37, the bar 47 is shifted to the right in its slide supports until the link assumes the position shown in light dotted lines (Fig. 6), in which position the center of gravity of the mass will be shifted so that the counterbalance weight will force the valve to the right or against port 37. When the valve is in use as shown, the doors 56 are maintained closed, but when it is desired to close the valve and prevent any possible danger of asphyxiating men in the gas main from which the valve is supposed to cut off the gas, these doors will be thrown open. In that event it will be seen that, when the valve is rotated to its closed position, an unobstructed ventilating passage will be formed which completely disconnects the ports 36 and 37, this passage way being formed top and bottom by the grated openings in the casing which are connected by the longitudinal port in the valve formed between the walls 40. This permits the air to circulate freely through the valve casing and no leakage gas can get to the men. When I refer to the valve as being rotatable, I mean that the valve shall have an axial support about which it swings angularly in opening and closing the ports in the seat, whether this movement be through an angle of 360° or less.

The principle of valve construction in these several structures is identical, but the details of construction may be varied in many particulars from the several forms shown without departing from the spirit of my invention.

Having thus described my invention, what I claim as new and desire to secure by Letters Patent, is:—

1. A valve mechanism for furnace gases comprising a valve casing having a valve chamber therein, there being an inlet port in a curved wall of the chamber and an outlet port, circular seats in said casing, a rotatable valve having a curved valve face to correspond to said curved wall and having circular bearing faces disposed eccentrically in said seats, and means which urge the valve in its operating positions toward said inlet port, substantially as described.

2. A valve mechanism comprising a valve chamber having inlet and outlet ports, a rotatable valve therein having its valve face curved on an arc struck from its axis, movable journal supports for said valve, and means to shift the valve bodily and force it against the portion of said chamber as a seat which surrounds the inlet port, and means to rotate the valve to open or close said port, substantially as described.

3. A valve mechanism comprising a valve chamber, there being an inlet port in a curved side wall thereof and an outlet port, a valve having a curved valve face adapted to move over the curved side of the chamber containing the inlet port as its seat, movable supports in which the axes of the valve are journaled, means to swing the valve against its said seat while it swings free from said chamber elsewhere, and means to operate the valve to open and close said port, substantially as described.

4. A valve mechanism comprising a valve casing having an open end to receive the valve, there being in said casing an outlet port and a curved side wall provided with an inlet port, and a rotatable valve adapted to be inserted in the chamber and having a valve face curved to correspond to said curved wall of the chamber, said valve being bodily adjustable toward said inlet port, means to urge the valve in its several operating positions to seat against said curved portion of the chamber, packing about the valve to close the said open end of the chamber, and means to operate the valve, substantially as described.

5. A valve of the character described comprising a casing having a cylindrical valve chamber open at its ends and having oppositely facing inlet and outlet ports in its curved wall, a cylindrical ported valve disposed eccentrically in said chamber, packing means surrounding the ends of the valve to close the open ends of said chamber, means to urge said valve bodily toward the inlet port to give it a tight seat there, and means to rotate the valve to open or close said inlet port, substantially as described.

6. In a valve of the character described, a valve casing having a chamber therein substantially cylindrical in shape which is open at one end and provided with inlet and outlet ports in its side wall, of a rotatable valve curved in cross section and adapted to be inserted in said chamber, counterbalance means to urge said valve toward the inlet port, means to rotate the valve, and packing between the open end of the chamber and said valve, substantially as described.

7. A valve of the character described comprising a valve casing formed from a metallic body transversely bored to form an open ended valve chamber therein, there being inlet and outlet ports in the side wall of said chamber, a rotatable valve disposed eccentrically in said chamber, counterbalance means engaging each end of the valve and acting to support and urge it toward the inlet port, operating means which engage an exposed end of the valve, and packing means around the valve ends to prevent leakage at the ends of the valve chamber, substantially as described.

8. In a valve of the character described, a valve chamber formed by boring a cylindrical transverse opening through a casting and providing it with lateral inlet and outlet ports, and a rotary valve having circular ends connected by a valve face curved in cross section, which valve is adapted to be inserted lengthwise into said chamber, packing means at each end of the valve to pack the ends of the valve chamber, means to operate the valve, stop means to engage and stop the valve in its open and closed positions, and counterbalancing means in which the valve is journaled and which urge it toward the inlet port, said valve ends being of sufficiently less diameter than the casing to give substantial clearance between said chamber and all but the portion thereof adjacent to the inlet port, substantially as and for the purposes described.

9. In a valve of the character described, a cylindrical valve chamber open at its ends and provided with lateral inlet and outlet ports, of a rotary valve adapted to be inserted in the chamber and eccentrically supported therein, said valve comprising circular end pieces and an arcuate valve face connecting said end pieces, spring packing interposed between said valve ends and the valve chamber, said packing comprising a split ring and radially and axially acting springs which hold the ring to its work, means to support the weight of the valve, and means to move it off center and toward said inlet port, substantially as described.

10. In a valve of the character described, a cylindrical valve chamber open at its ends and provided with lateral inlet and outlet ports, of a valve adapted to be inserted in the chamber and comprising circular end pieces and an arcuate valve face connecting said end pieces, packing interposed between said valve ends and the valve chamber, trunnions at the center of said end plates, a counterbalancing means for the valve comprising lever arms in which said trunnions are rotatably mounted, fulcrums for the levers, means to weight the lever ends to support the valve and urge it toward the inlet port, stop means for the valve, and means to operate the valve, substantially as described.

11. In a valve of the character described, a cylindrical valve casing open at its ends and having lateral inlet and outlet ports, a rotatable valve having cylindrical end plates and a curved bearing face which is adapted to close the inlet port, packing interposed between the ends of the valve and its chamber, stop plates adapted to engage the valve and stop it in open or closed positions, trunnions at the ends of the valve, lever arms in which said trunnions are journaled, fulcrum pins carried by said stop plates and engaged by said arms, and a counterbalance weight acting on said arms to move them about their fulcrums to both counterbalance the weight of the valve and urge it against the inlet port, and means to operate the valve, substantially as described.

12. A valve mechanism for furnace gases, comprising a valve casing provided with inlet and outlet ports and substantially circular valve seats, a rotatable valve having curved bearing faces which fit with a substantial clearance in said seats, means to support the valve off the bottom of its seats, means to move the valve against the inlet port with its axis eccentric to said seats, and one or more slots provided in the bearing face at the bottom of the seats, substantially as described.

13. In a valve for furnace gases, a valve chamber having a circular valve seat, a rotatable valve therein having a circular bearing face, means to support the weight of the valve off the bottom of said seat, and a cinder and dust catching slot which intersects the said bottom of the seat, substantially as described.

14. The combination with a valve casing having inlet and outlet ports, and a valve seat in said casing, of a valve in said casing, pivotal supporting means for the valve which tend to hold its weight off said seat and urge it toward the inlet port, substantially as described.

15. The combination with a valve casing having inlet and outlet ports, of a valve therein mounted on trunnions, and counterbalancing leverage means in which said trunnions are journaled which tend to lift the weight of the valve off said casing and urge it bodily toward the inlet port of said casing.

16. A valve mechanism comprising a valve casing, a rotatable valve therein having a movable axis, and means to yieldingly urge said valve bodily against the inlet port in said casing.

17. In combination, an open ended valve casing having a valve seat, a rotatable valve therein having a free axis, means tending to support the valve weight off said seat, means to pack the clearance between the valve and the open end of the casing, and means to urge the valve bodily toward a port in said casing, substantially as described.

18. In a furnace gas valve mechanism, the combination of a valve casing having inlet and outlet ports, a ported valve therein adapted to open or close said ports, and ventilating openings in said casing adapted to register with the port in said valve when it is in position to close said ports in the casing, substantially as described.

19. A valve mechanism for gas mains comprising a seat provided with inlet and outlet ports and with oppositely disposed ventilating openings, means to normally close said openings, a rotatable valve in the casing having a port adapted to register either with the ports in the casing and with said ventilating openings, substantially as described.

In testimony whereof I affix my signature in presence of two witnesses.

MARK W. JOHNSON, Jr.

Witnesses:
 NOMIE WELSH,
 R. D. JOHNSTON, Jr.

Copies of this patent may be obtained for five cents each, by addressing the "Commissioner of Patents, Washington, D. C."